United States Patent
Kulkarni et al.

(10) Patent No.: US 7,444,618 B2
(45) Date of Patent: Oct. 28, 2008

(54) AUTOMATIC GENERATION OF BATCH PROGRAMS WITH IDENTIFICATION, INSERTION OF INVARIABLES, DECLARATIVE STATEMENTS AND VARIABLES WITH THE USE OF PLACE-MARKS

(75) Inventors: Vinay Vasant Kulkarni, Pune (IN); Sreedhar Sannareddy Reddy, Pune (IN); Shashank Madhukar Kulkarni, Pune (IN); Vilas Sadanand Prabhu, Columbus, IN (US)

(73) Assignee: Tata Consultancy Services Limited, Mumbai (IN)

( * ) Notice: Subject to any disclaimer, the term of this patent is extended or adjusted under 35 U.S.C. 154(b) by 1100 days.

(21) Appl. No.: 10/083,174

(22) Filed: Feb. 25, 2002

(65) Prior Publication Data

US 2003/0131339 A1    Jul. 10, 2003

(30) Foreign Application Priority Data

Aug. 6, 2001    (IN)    .................. 760/MUM/2001

(51) Int. Cl.
*G06F 9/44*    (2006.01)
(52) U.S. Cl. ..................... 717/114; 717/106
(58) Field of Classification Search ......... 717/100–114; 706/1
See application file for complete search history.

(56) References Cited

U.S. PATENT DOCUMENTS

| 6,018,627 | A * | 1/2000 | Iyengar et al. ............... 395/701 |
| 6,199,195 | B1 * | 3/2001 | Goodwin et al. ................ 717/1 |
| 6,208,345 | B1 * | 3/2001 | Sheard et al. ................ 715/853 |
| 6,615,199 | B1 * | 9/2003 | Bowman-Amuah ............ 706/1 |
| 6,715,145 | B1 * | 3/2004 | Bowman-Amuah ......... 718/101 |
| 6,742,015 | B1 * | 5/2004 | Bowman-Amuah ......... 718/101 |
| 7,293,254 | B2 * | 11/2007 | Bloesch et al. .............. 717/108 |
| 2002/0023261 | A1 * | 2/2002 | Goodwin et al. ............ 717/136 |

FOREIGN PATENT DOCUMENTS

IN    760/MUM/2001    8/2001

OTHER PUBLICATIONS

Not a Batch Language; A Control Language, E.H. Bristol, 14 pages, 1995 World Batch Forum, May 22-24, 1996.*
Integrating UML Diagrams for Production Control Systems, Hans J. Kohler et al, ACM, pp. 241-251, 2000.*
Object-Oriented Modelling and Simulation of Batch Plants, Wollhaf k, et al, Abstract, 1 page , Nov. 30, 1995.*
An Object Oriented Job Execution Environment, Lance Smith et al, IEEE, 2000, 13 pages.*

(Continued)

*Primary Examiner*—Todd Ingberg
(74) *Attorney, Agent, or Firm*—Central Coast Patent Agency, Inc.

(57) ABSTRACT

A model framework for generating batch programs has an abstraction representing a batch program, an abstraction representing a batch function of the program, an abstraction representing operation of the function, an abstraction representing a data provider to the function, and an abstraction representing a context class of the function. The framework is characterized in that instantiation of the model with the appropriate input data parameters input to each abstraction generates appropriate instances of batch functions including function operations wherein the generated instances are executable as part of a run sequence of the batch program.

12 Claims, 2 Drawing Sheets

Structure of a batch program

OTHER PUBLICATIONS

UML Distilled Applying the Standard Object Modeling Language, Martin Fowler, Whole Manual , 1997.*

Bjarne Stroustrup, "The Design and Evolution of C++", Pp. 423-426, Mar. 9, 1994.*

Margret Ellis et al, "The Annotated C++ Reference Manual ANSI Base Document", pp. 369-385, 397-399, Jun. 7, 1990.*

* cited by examiner

AUTOMATIC GENERATION OF BATCH PROGRAMS WITH IDENTIFICATION, INSERTION OF INVARIABLES, DECLARATIVE STATEMENTS AND VARIABLES WITH THE USE OF PLACE-MARKS

FIELD OF THE INVENTION

The present invention is in the field of software development and pertains particularly to methods and apparatus for implementing batch programs.

CROSS-REFERENCE TO RELATED DOCUMENTS

This patent application case claims priority to Indian provisional patent application number 760/MUM/2001 filed on Aug. 6, 2001. The entire specification and drawings of Indian patent application number 760/MUM/2001 is incorporated herein by reference.

BACKGROUND OF THE INVENTION

Business software development and implementation continues to be an area of research and improvement over the years. In general, business functionality for any complex business application can be broadly categorized into two areas. These are online functionality and batch functionality. Online functionality of a particular business application comprises the functions typically executed by one or more external users of the application while internal users execute batch functionality of the application transparently. Success attributes of the executions of internal batch functions of the application have direct impact on the success attributes of executions of online functionality. Since businesses strive to make online functionality available to their users for as much time possible during a work period, it is obviously critical that batch processes finish within an optimally short period of time.

Designing and implementing batch programs is a labor-intensive task requiring that several orthogonal strategies be integrated in a consistent and homogenous manner. The main strategic requirements that must be realized in developing a successful batch program are memory management, data recovery and restart capability, scheduling capability, error logging, and diagnostic capability.

Typically a batch program processes a large volume of data at any given time and is generally resource intensive. A batch program typically has at least some ability to recover from errors and restart with minimal re-computations. However, a batch program must be able to finish within a given timeframe. In prior-art, there is no tool support for generating and managing batch programs in a comprehensive manner that provides support for all of the requirements described above.

The traditional approach to designing implementing and managing batch programs is to first document the issues involved, provide sample code and guidelines for design, and then manually write the programs that are expected to meet the various and often complex design requirements of the program. Hand-coded programs tend to be error-prone and require considerable effort to implement and to test for functionality. Therefore, it is desired to reduce instances of required manual programming as much as possible.

What is clearly needed is a method and apparatus that can enable various design strategies of a batch program to be patterned as models supported by a model framework such that a user may simply initiate a model abstraction of the program and then leave it up to the frame work and code generators to automatically implement a correct batch program.

SUMMARY OF THE INVENTION

In a preferred embodiment of the present invention a model framework for generating batch programs is provided, comprising an abstraction representing a batch program, an abstraction representing a batch function of the program, an abstraction representing operation of the function, an abstraction representing a data provider to the function; and an abstraction representing a context class of the function. The framework is characterized in that instantiation of the model with the appropriate input data parameters input to each abstraction generates appropriate instances of batch functions including function operations wherein the generated instances are executable as part of a run sequence of the batch program.

In preferred embodiments the modeling language is Unified Modeling Language (UML). Further, instantiation creates user-instance functions that are operationally linked and together define a user-instance of batch program. The code required to generate the user instance functions defining the program may be automatically generated by the model as a result of data input and subsequent instantiation. Also, the data provider may obtain its data from a database by query. In some embodiments one batch function indicates if memory management should be provided. In others the class encapsulates restart information and information passed between different operations.

In another aspect of the invention a method for developing an executable batch program through model instantiation is provided comprising steps of (a) providing an executable model abstraction including batch program, batch function, context class, data provider, and operation objects; (b) inputting data into the model abstraction, the input data defining a user instance class of batch program; (c) instantiating the model abstraction; (d) generating code within the model abstraction, the code defining user instances of batch functions including operations and execution orders; and (e) executing the generated code to generate the user instance batch program.

In preferred embodiments of the method the model framework is a meta model framework. In step (a) the modeling language may be UML. Further, steps (d) and (e) may be automated.

DESCRIPTION OF THE PREFERRED EMBODIMENTS

Figure 1:
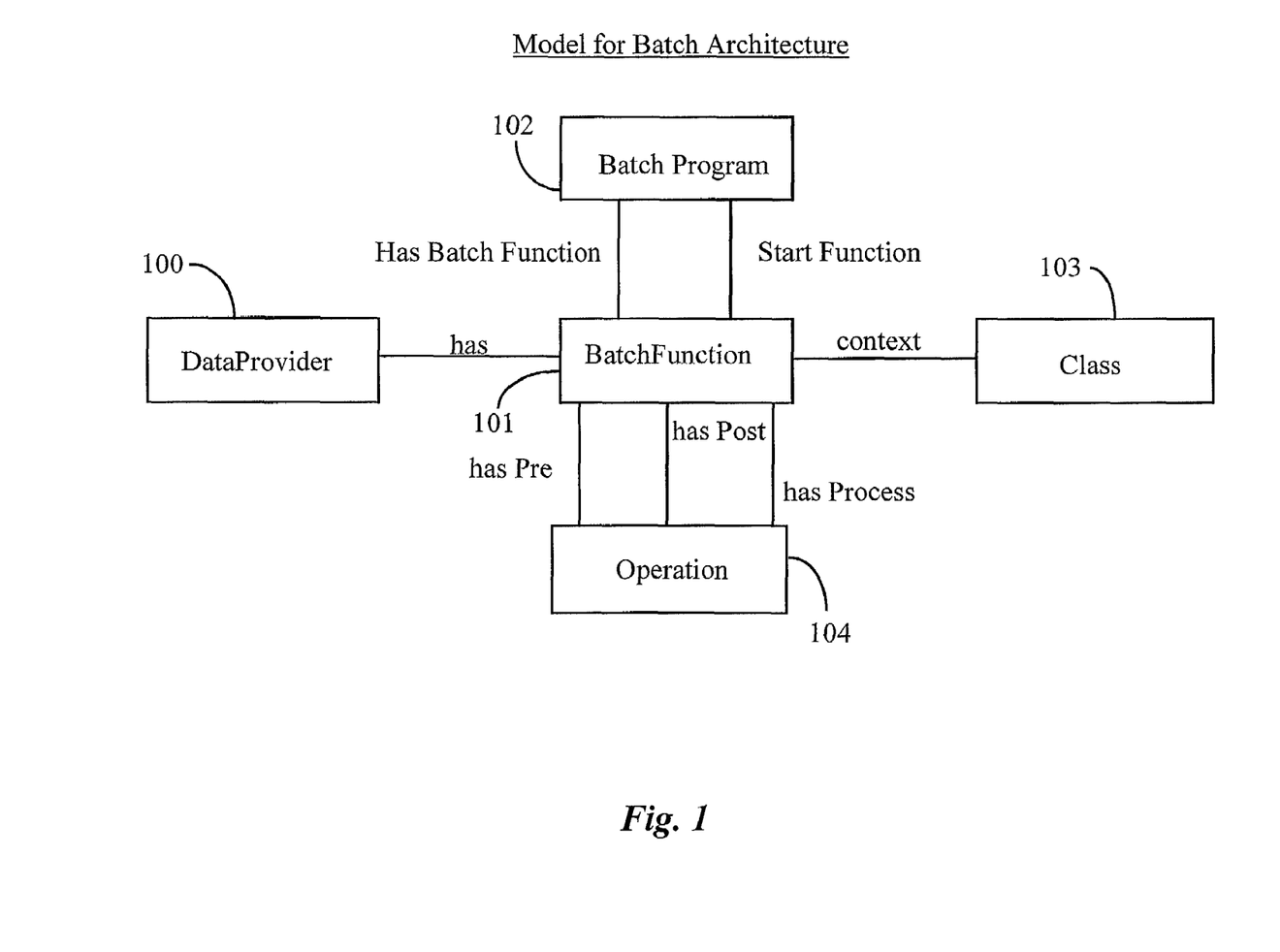
FIG. 1 is a block diagram illustrating a batch model according to an embodiment of the present invention.

FIG. 1 is a block diagram illustrating a batch model according to an embodiment of the present invention. The architecture presented herein represents a meta model supported by a meta meta model framework known to the inventor wherein the meta meta model framework has three hierarchical levels of model structure. The most abstract of these is the meta meta model followed by a meta model (instance of meta meta model) followed by a user model (instance of meta model).

A batch program 102 represents the highest level in the architecture. Program 102 is an executable program that can be scheduled to execute using a batch scheduler. A batch program 102 has at least one batch function illustrated herein as batch function 101. More particularly, program 102 represents a set of functions 101 that can be executed in a particular sequence as well as in a nested manner (one calls another). One of functions 101 is a start function as so indicated. Batch function 101 has a data provider illustrated herein as data provider 100. Data provider 100 provides the source data for processing to a batch function.

Batch function 101 has pre-operations, process-operations and post-operations, which, in one embodiment can be unified modeling language (UML)-based operations. These are represented as operation set 104 in this example.

Batch function 101 has a context class 103. Class 103 encapsulates restart information as well as pertinent data that is passed between pre, process, and post operations of a particular function 101. A property to indicate if the model supporting framework should provide memory management for a particular batch function is not shown specifically, but may be assumed to be present as an instance of a batch function. It is noted herein that batch program 102 has a starting batch function (instance of 101) associated with it. A starting batch function is the first batch function to be invoked when the program control (not shown) of an application reaches a particular batch program to be executed.

In this example a model-based approach presents a meta model that externalizes the structure of a batch program design pattern. A specific batch program is then modeled as an instance of the meta model. Model-based code generation tools (not shown) are used to interpret the user model to generate implementations of the executable batch programs having batch functions and operations. The term pattern is defined in terms of meta model entities.

A specific batch program exhibits the following structure and behavior:

```
Int main( int argc, char *argv)
{
    Step1: Perform system initializations
    Step2: Perform set up required for this batch program to be invoked
    Step3: Invoke starting batch function of this batch program by
passing the necessary context information
    Step4: Log errors, if any.
    Step5: Perform wind up activities for this batch
    Step6: Release system resources obtained, if any.
    Step7: Return with the status
}
```

The framework that supports the model-based generative approach provides a default behavior for steps 1, 4, 5 and 6 described immediately above. A user can also, if desired, override default behavior. A batch function analogous to function 101 is invoked either through a batch program such as program 102 (as its starting function) or through pre-process, process, or through post-operations of another batch function of the batch program.

A batch function accepts a restart flag (restartFlag) and batch program context as input parameters, batch function context as in-out parameter and returns status. A batch function conforms to the following structure:

```
If( restart )
Then
    Obtain batch function context at the time of last successful commit.
    If( previous failure was in Pre function ) Then goto Pre.
    If( previous failure was in Process function ) Then goto Process.
    If( previous failure was in Post function ) Then goto Post.
Else
    Obtain batch function context from the input parameter.
Fi
Pre:
Push context of this batch function onto stack
Invoke Pre operation of the batch function by passing the necessary
parameters.
Pop the stack
Process:
For all objects fetched by the associated data provider
Do
    Push context of this batch function onto stack
    Invoke Process operation of the batch function by passing the
necessary parameters.
    Invoke Commit operation of the framework
    Pop the stack
Done
Post:
Push context of this batch function onto stack
Invoke Post operation of the batch function by passing the necessary
parameters.
    Pop the stack
```

It is noted herein that the code described immediately above reflects purely the structure of a batch function. Behavior of a batch function is provided by Pre, Post and Process operations and is completely under the control of user. Nesting of batch functions is possible by invoking a batch function (callee) from the process operation of a batch function (caller). Sequencing of batch functions is possible by invoking a batch function (next) from the post operation of a batch function (current) or a batch function (prev) from the pre-operation of a batch function (current).

A model framework denoted by a tri-level abstraction criteria is provided to identify and model batch program patterns and to instantiate those modeled patterns in order to automatically generate the code for specific application or user instances, which are the actual batch programs and associated functions. The framework supports multiple platforms through adaptors and uses state of the art model repository capability.

Figure 2:
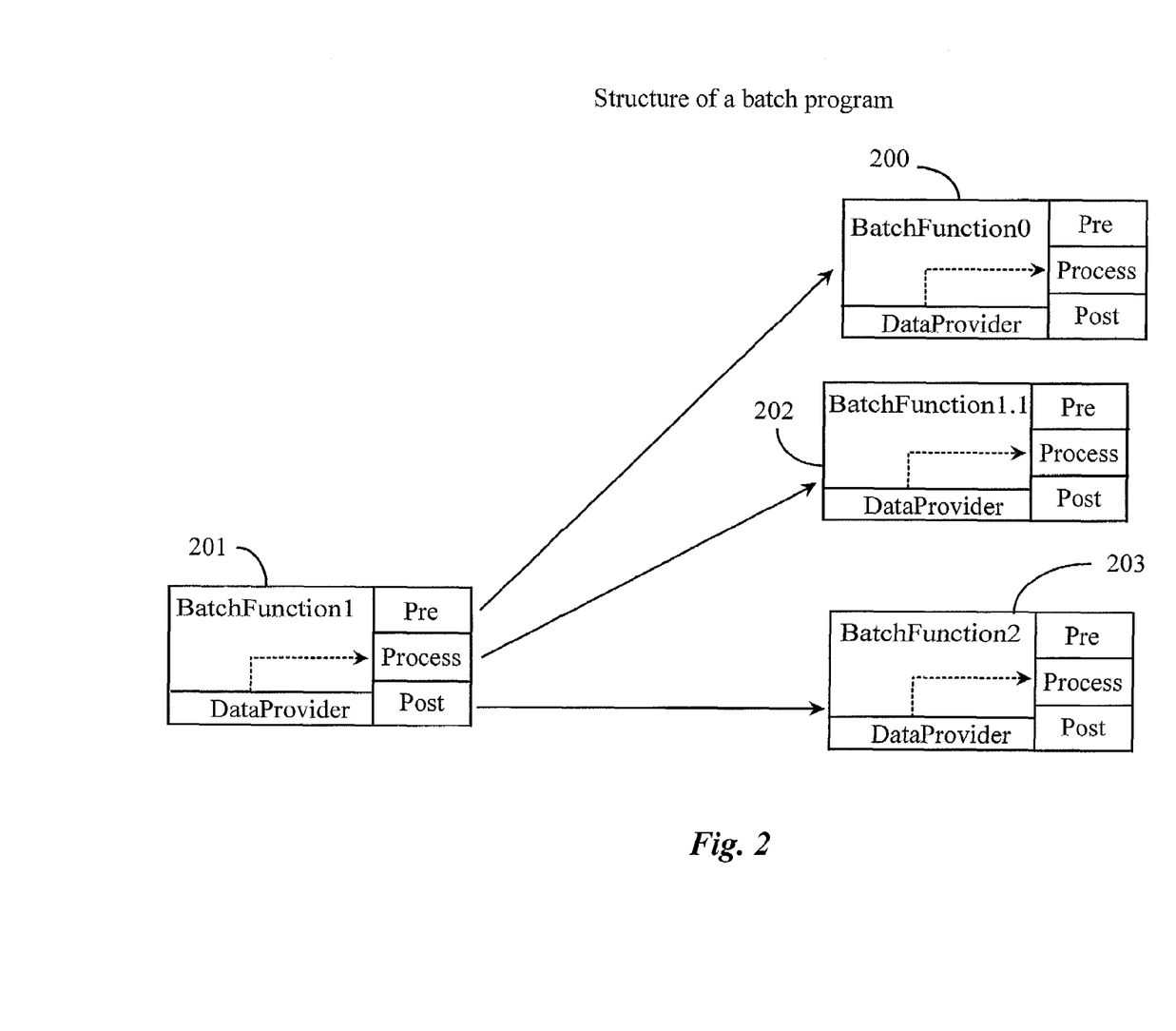
FIG. 2 is a block diagram illustrating structure of a batch program according to an embodiment of the present invention.

FIG. 2 is a block diagram illustrating structure of a batch program according to an embodiment of the present invention. The structure of a batch program consists of a plurality of operationally linked batch functions illustrated herein as batch functions 0, 1, 1.1, and 2. A batch function is invoked either by a batch program (as its starting batch function), or by another batch function within the program. Therefore order of execution can be in sequence from a starting function or execution may follow a nested pattern. In an example of a nested order, a batch function (caller) may invoke another batch function (callee) from the Process operation of the former function.

In this example, batch functions 0, 1, 1.1, and 2 are also given the element numbers 200, 201, 202, and 203 and will herein be referred to either by element number or by label number. Any one of batch functions 200-203 may be a starting function of the batch program. A batch program must have a starting batch function. Each batch function of a batch program has a data provider block illustrated logically herein in each of functions 200-203 as a block labeled Data Provider.

The Data Provider of functions 200-203 is responsible for providing the correct data to be processed by each batch function. Typically, the data is provided as the result of a database query initiated through a cursor method, the data arriving in data chunks. Output of a Data Provider is passed as input to a Process operation of a batch function. In this example, each batch function illustrated (200-203) has a Pre-process operation, a Process operation, and a Post-process operation. These operations are illustrated as blocks labeled Pre, Process, and Post associated respectively as a set (Pre, Process, and Post) with each batch function 200-203. As is indicated by a dotted directional arrow illustrated within each of batch functions 200-203, the Data Provider block of each function provides its data to the Process operation of the function. The Data Provider block is expected to make use of the context class of a batch function (FIG., 1 element number 103) so as to provide correct data in normal as well as restart modes of program operation.

Referring now back to FIG. 1, the context class of a batch function (Class 103) contains restart data required for restarting a batch function, restart data for restarting the Data Provider block of the function and data required to enable Pre operations, Post operations, and Process operations of the batch function to successfully communicate with each other within the function and from one function to another function.

The supporting framework is responsible for writing context of a batch function to persistent data storage at the time of commit operation. The framework provides default behavior for the Commit operation. This default behavior can be overwritten. The modeling framework provides a modeling abstraction (meta model) for the Data Provider block of a batch function as well as an instance generation mechanism.

Referring now back to FIG. 2, there are three separate invocation possibilities illustrated in this example by directional arrow. All three assume that batch function 201 is the starting function. For example, a sequence invocation is illustrated by a directional arrow emanating from the Pre operation of function 201 and progressing to function 200, function 200 being a previous function. A nesting invocation is illustrated by a directional arrow emanating from the Process operation of function 201 and progressing to function 202. More than one function may be invoked in this way. A post sequence invocation is illustrated by a directional arrow emanating from the post operation of function 201 and progressing to function 203, which is a "next" function in sequence. The specific order that is an invocation sequence may start from any designated batch function. One with skill in the art will recognize that there are many possible design alterations in terms of sequence. As previously described, framework classes provide a default behavior for commit control that is based on a commit frequency. These classes can, however be overridden to enable customized commit control as will be explained in more detail below. Batch architecture is supported through 2 public classes, Batch Program (BatchPgm) and Batch Function (BatchFunction). A persistent table is provided (BatchControlTable) for storing data particulars such as batch program identification, restart status information, and context information. The structure of a context header table is;

<BatchProgramId, RestartStatus, BatchContext_in_serialised_form >.

The pseudo code presented below describes the framework classes parameters and instance implementation process;

One with skill in the art of modeling will realize and understand the pseudo code provided by the inventor as a descriptive tool. It is also noted herein that the inventor insets explanation and description where appropriate in the following pseudo code.

```
Typedef ErrorStatus (*BatchFn) (BatchPgm*, CppObj*, CppObj*&);
Class BatchPgm
{
protected:
        long count;            // counter
        long commitThreshold;       // commit frequency
        BatchFn startingBatchFunction;
        char *batchPgmId;
        long restartStatus;
        // context of starting batch function
        CppObj *startFuncContext;
        // Stack of Batch Function contexts
        XLDArray *bfRestartStack;
        // Stack of Batch Function contexts
        XLDArray *bfContextStack;
        // Darray of < "<batchFunctionName>", void * >
        // i.e. struct CommitControl used by overriding
        // Commit( ) functions
        // void * serves as shared memory using which BatchProgram and
        // BatchFunction coordinate commit behaviour. For example, the
        // data could be <batchFunctionName> instance in a serialised
        // form
        Darray *commitArray;
        // Array to hold
        // <batchFunctionName, batchFunction, memMgmtFlag,
        BatchFunction> // tuples for the batch program
        static BatchFunctionDescriptor batchFunctionArray[ ];
Public:
        // Constructor
        <BatchProgram> ( char *batchProgramId, BatchFn startFunc ):
        batchPgmId(batchProgramId), startingBatchFunction(startFunc)
        {
            bfContextStack = new XLDArray;
            bfRestartStack = new XLDArray;
            commitAry = new DArray;
            startFuncContext = NULL;
```

```
}
long GetRestartStatus( ) { return restartStatus; }
// To set up DB connections, initialise memory pools, message
// array etc. after invoking Init( argc, argv )
// Format of configuration file for a batch program
// BatchProgram <batchProgramName>
// {
//     commitThreshold = <value>;
//     batchPgmId = <value>;
//     DbConnectionInfo = <DbConnectionString>;
//
//     BatchFunction <batchFunctionName>
//     {
//         commitThreshold = <value>;
//     }
//     .
//     .
//     .
// }
ErrorStatus Setup( int argc, char *argv [ ] )
{
    // Parse input arguments
    // -c gives configuration file name for batch program
    char *configFileName;
    // Open config file and set the following
    //     - BatchPgm::commitThreshold
    //     - BatchPgm::batchPgmId
    //     - for each BatchFunction specified
    //         - Instantiate <BatchFunction> object
    //         - Set commitThreshold
    //         - Add to the corresp element in
    //             batchFunctionArray
    //     - for each BatchFunction not specified
    //         - Instantiate <BatchFunction> object
    //         - Set commitThreshold = 0
    //         - Add to the corresp element in
    //             batchFunctionArray
    //
    //     - Read DbConenctionInfo and connect to DB
    //
    // If config file does'nt exist or is empty or the field
    //     unspecified
    //     - set BatchPgm::commitThreshold = 1
    //     - for each element in batchFunctionArray
    //         - Instantiate <BatchFunction> object
    //         - Set commitThreshold = 0
    //         - Add to the corresp element in
    //             batchFunctionArray
    return Init( argc, argv );
}
// Complementary of Setup( )
ErrorStatus Cleanup( );
// default Init( ) implementation supplied by framework
Virtual ErrorStatus Init(int argc, char *argv ){ }
// Entry point of the batch program
ErrorStatus Exec( )
{
    ErrorStat retVal;
    BatchControlInfo *batchControlInfo =
        new BatchControlInfo( batchPgmId );
    retVal = batchControlInfo->Get( );
    if( retVal != DM_SUCCESS )
    {
        batchControlInfo->SetRestartStatus( FRESH );
        restartStatus = FRESH;
        retVal = batchControlInfo->Create( );
        if( retVal != DM_SUCCESS )
        {
            return ERROR;
        }
    }
    else
    {
        restartStatus = RESTART;
        bfRestartStack->unBundle
        (batchControlInfo->GetBatchContextBuffer( ))
    }
    retVal = startingBatchFunction( this, startFuncContext, startFuncContext );
    if( retVal == SUCCESS )
```

```
            {
                    retVal = Commit( FORCED );
                    if( retVal != SUCCESS )
                    {
                            return ERROR;
                    }
                    batchControlInfo->Delete( );
                    return SUCCESS;
            }
            return ERROR;
    }
    // default Commit( ) implementation supplied by framework
    Virtual ErrorStatus Commit( int flag = UNFORCED )
    {
            count++;
            if( flag == FORCED || count > commitThreshold )
            {
                    BatchControlInfo *bcInfo =
                    new BatchControlInfo( batchPgmId );
                    long size = bfContextStack->sizeOfClass( );
                    char *buf = new char [size];
                    bfContextStack->bundle( buf );
                    bcInfo->SetBatchContextBuffer( buf );
                    bcInfo->SetRestartStatus( RESTART );
                    status = bcInfo->Modify( );
                    if( status == ERROR )
                    {
                            return ERROR;
                    }
                    status = MC__Commit( );
                    if( status == ERROR )
                    {
                            return ERROR;
                    }
                    ResetCommitInfo( );
                    return SUCCESS;
            }
            return SUCCESS;
    }
    // default ResetCommitInfo( ) implementation supplied by
    framework
    Virtual void ResetCommitInfo( )
    {
            count = 0;
            int nElem = sizeof( batchFunctionArray )
                    / sizeof( BatchFunctionDescriptor );
            for( int I = 0; I < nElem; I++ )
            {
                    BatchFunctionDescriptor *elem = batchFunctionArray[I];
                    BatchFunction *bf = elem->bfCommit;
                    Bf->ResetCommitInfo( this );
            }
    }
    // default LogErrors( ) implementation supplied by framework
    Virtual void LogErrors( )
    {
            Message *elem;
            For( int I=0, nElem=messageArray->nElem( ); I < nElem; I++)
            {
                    elem = (*messageArray)[nElem];
                    elem->LogErrors( );
            }
    }
    ErrorStatus GetMyContext(int &lbl, char *bfName, CppObj *&cntxt )
    {
            int nElem = bfRestartStack->nElem( );
            if( nElem == 0 )
            {
                    return EMPTY;
            }
            for(int I = 0; I < nElem; I++)
            {
                    BFStackFrame *elem;
                    Elem = (BFStackFrame *)(( *bfRestartStack)[I]);
                    If( !strcmp( batchFunctionName, elem->GetName( )))
                    {
                            if( cntxt->IsDeepCopyReqd( ))
                            {
                                    cntxt->DeepCopy(elem->GetContext( ), cntxt);
```

```
                    }
                    else
                    {
                         cntxt = elem->GetContext( );
                    }
                    lbl = elem->GetLabel( );
                    bfRestartStack->Delete( elem );
                    return SUCCESS;
               }
          }
          return ERROR;
     }
     ErrorStatus PushContext(int label, char *batchFunctionName, CppObj *batchFunctionContext )
     {
          BFStackFrame *elem =
          new BFStackFrame( label, batchFunctionName, batchFucntionContext );
          BfContextStack->Append( elem );
     }
     ErrorStatus PopContext( int& lbl, CppObj& batchFunctionContext )
     {
          BFStackFrame *elem;
          Int nElem = bfContextStack->nElem( );
          Elem = (*BTStackFrame *)((*bfContextStack)[nElem – 1]);
          BatchFunctionContext = elem->GetContext( );
          Lbl = elem->GetLabel( );
          BfContextStack->Delete( elem );
     }
     BatchFunctionDescriptor *SearchBatchFunction(char* bfName )
     {
          // Performs binary search over batchFunctionArray[ ]
          // to return the array element
          // Array initialisation code should be generated
          // from the model so as to have batchFunctionNames
          // in the sorted order
     }
     ErrorStatus CallBatchFunction(char *bfName, CppObj *cntxt );
};
Class BatchControlInfo
{
private:
     char *batchPgmId;
     Long restartStatus;
     Void *batchContextBuffer;
Public:
     // Default constructor
     BatchControlInfo( char *pgmId )
     {
          batchPgmId = pgmId;
          batchContextBuffer = NULL;
     }
     void *GetBatchContextBuffer( ) { return batchContextBuffer; }
     void SetBatchContextBuffer( void *buf )
     {
          batchContextBuffer = buf;
     }
     void *GetBatchPgmId( ) { return batchPgmId; }
     void SetBatchPgmId( char *id )
     {
          batchPgmId = id;
     }
     void *GetRestartStatus( ) { return restartStatus; }
     void SetRestartStatus( long val )
     {
          restartStatus = val;
     }
     // Std DM Create( ) method
     ErrorStatus Create( ) { }
     // Std DM Get( ) method
     ErrorStatus Get( ) { }
     // Std DM Modify( ) method
     ErrorStatus Modify( ) { }
     // Std DM Delete( ) method
     ErrorStatus Delete( ) { }
};
class BFStackFrame : CppObj
{
private:
     char *name;
     CppObj *context;
```

-continued

```
        int label; // enum of PRE, POST and PROCESS
Public:
        BFStackFrame( int lbl, char *nm, CppObj *o ):
            label(lbl), name(nm), context(o) {12 }
        Char *GetName( ) { return name;}
        CppObj *GetContext( ) { return context; }
        Void SetLabel( int val ) { label = val; }
        Int GetLabel( ) { return label; }
}
Class BatchFunction
{
protected:
        long count;
        long commitThreshold;
public:
        virtual char *GetBatchFunctionName( ) { return ""; }
        virtual ErrorStatus Commit( BatchProgram *bp )
        {
            BatchFunctionDescriptor *bpDesc = bp->SearchBatchFunction( GetBatchFunctionName( ));
            BatchFunction *singleton = bpDesc->bfCommit;
            Singleton->count++;
            If(singleton->commitThreshold != 0 )
            {
                If( singleton->count > singleton->commitThreshold )
                {
                    return bp->Commit( FORCED );
                }
            }
            bp->Commit( );
        }
        // default implementation provided by framework
        virtual void ResetCommitInfo(BatchPgm *bp)
        {
            count = 0;
        }
};
Struct BatchFunctionDescriptor
{
        char *batchFunctionName;
        BatchFn batchFunction;
        Bool memMgmtReqd;
        BatchFunction *bfCommit;
}
Struct CommitControl
{
        char *batchFunctionName;
        void *commitData;
}
```

In a preferred embodiment of the present invention, every modeled batch program is realized in the framework as a class as is illustrated below by the following pseudo code.

```
Class <BatchProgramName> : BatchPgm
{
public:
        <BatchProgram> ( char *batchProgramId, BatchFn startFunc ) :
        BatchPgm( batchProgramId, startFunc ) { }
        ErrorStatus Init( int argc, char* argv )
        {
            // default behaviour provided by framework can be
            // overridden to set startFuncContext as required
            return BatchPgm::Init(srgc, argv);
        {
        ErrorStatus Commit( )
        }
            // default behaviour provided by framework can be
            // overridden as required
            return BatchPgm::Commit( );
        }
        // This function overrides ResetCommitInfo( )
        ErrorStatus ResetCommitInfo( )
        {
```

-continued

```
        BatchPgm::ResetCommitInfo( );
        // Codes the overriding behaviour here
    }
    void LogErrors( )
    {
        // default behaviour provided by framework can be
        // overridden as required
        return BatchPgm::LogErrors( );
    }
};
static <BatchProgramName>::batchFunctionArray[ ] =
{
{ "<batchFunctionName>", <BatchFunctionName>::sh_<batchFunctionName>, TRUE /
FALSE, NULL },
:
:
:
};
```

Function main for every modeled batch program is generated as shown below,

```
Int main( int argc, char *argv )
{
    ErrorStatus retVal;
    //Instantiate the modelled batch program
    <BatchProgramName>*batchProgram =
    new <BatchProgramName>(<BatchProgramName>,
    <startBatchFunction>);
    retVal = batchProgram->Setup( argc, argv );
    if( retVal == ERROR )
    {
        batchProgram->LogErrors( );
        exit(1);
    }
    retVal = batchProgram->Exec( );
    if( retVal == ERROR )
```

-continued

```
    {
        batchProgram->LogErrors( );
        exit(1);
    }
    retVal = batchProgram->Cleanup( );
    if( retVal == ERROR )
    {
        batchProgram->LogErrors( );
        exit(1);
    }
    exit(0);
}
```

In a preferred embodiment of the present invention, every modeled batch function is realized in the framework as a class as is illustrated below by the following pseudo code.

```
Class <BatchFunctionName> : BatchFunction
{
public:
    // Pre, Process and Post methods are implemented by user
    ErrorStatus Pre(BatchPgm *batchProgram, <Context> *inContext, <Context> *&
outContext);
    ErrorStatus Process( BatchPgm *batchProgram, <Context> *inContext,
<ReturnTypeOfDataProcessor> *inData, <Context> *&outContext );
    ErrorStatus Post( BatchPgm *batchProgram, <Context> *inContext, <Context>
*& outContext );
    // sh_<batchFunctionName> is generated
    ErrorStatus sh_<batchFunctionName>( BatchPgm *batchProgram, <Context>
*inContext, <Context> *& outContext );
    Char *GetBatchFunctionName( ) { return "<BatchFunctionName>"; }
    // This function overrides commit( )
    ErrorStatus Commit( BatchPgm *bp )
    {
        BatchFunction::Commit( bp );
        // Codes the overriding behaviour here
    }
    // This function overrides ResetCommitInfo( BatchPgm *bp )
    ErrorStatus ResetCommitInfo(BatchPgm *bp)
    {
        BatchFunction::ResetCommitInfo(bp);
        // Codes the overriding behaviour here
    }
};
```

Generated code for a shell of a batch function is as below.

```
ErrorStatus <BatchFunctionName> :: sh_bf1( BP1 *batchProgram,
    Con1 *inContext, Con1 *& outContext )
{
    ErrorStatus status;
    Int lb1;
    Long restartStatus = batchProgram->GetRestartStatus( );
    Con1 *context = ( inContext == NULL) ? new Con1 : inContext;
    If( restartStatus == RESTART )
    {
        status = batchProgram.GetMyContext(lb1, "bf1", context );
        if( status != EMPTY )
        {
            if( status != SUCCESS )
            {
                return ERROR;
            }
            switch( lb1 )
            {
                case PRE: goto Pre_label;
                case PROCESS: goto Process_label;
                case POST: goto Post_label;
            }
        }
    }
Pre_label:
    Status = batchProgram.PushContext( PRE, "bf1", context );
    if( status != SUCCESS )
    {
        return ERROR;
    }
    Status = Pre_bf1( batchProgram, context, context );
    if( status != SUCCESS )
    {
        return ERROR;
    }
    Status = batchProgram.PopContext( lb1, context );
    if( status != SUCCESS )
    {
        return ERROR;
    }
Process_label:
    // Return value of data provider of bf1
    DP1_out *dataObj = new DP1_out;
    Status = DP1::Open( context );
    if( status != SUCCESS )
    {
        return ERROR;
    }
    While( 1 )
    {
        status = DP1::Fetch( dataObj );
        if( status == ERROR )
        {
            return ERROR;
        }
        if( status == DATA_OVER ) break;
        Status=batchProgram.PushContext(PROCESS,"bf1", context );
        if( status != SUCCESS )
        {
            return ERROR;
        }
        status=Process_bf1( batchProgram, context,
                    dataObj, context );
        if( status != SUCCESS )
        {
            return ERROR;
        }
        status = Commit( batchProgram );
        if( status != SUCCESS )
        {
            return ERROR;
        }
        Status = batchProgram.PopContext( lb1, context );
        if( status != SUCCESS )
        {
            return ERROR;
        }
    }
    DP1::Close( );
Post_label:
    Status = batchProgram.PushContext( POST, "bf1", context );
    if( status != SUCCESS )
    {
        return ERROR;
    }
    Status = Post_bf1( batchProgram, context, context );
    if( status != SUCCESS )
    {
        return ERROR;
    }
    Status = batchProgram.PopContext( lb1, context );
    if( status != SUCCESS )
    {
        return ERROR;
    }
    outContext = context;
    return SUCCESS;
}
```

In the code illustrated above, the term shell denotes a method or operation of a class.

A batch function can be tagged as MemoryManaged in the model. In the case of tagging for memory management, the framework manages memory for invocation of the batch function as shown in the code sample provided below.

```
ErrorStatus BatchPgm::CallBatchFunction(char *bfName, CppObj *cntxt )
{
    long PrevId, poolId;
    BatchFunctionDescriptor *bfDescriptor;
    ErrorStatus status;
    BfDescriptor = SearchBatchFunction( bfName );
    If( bfDescriptor == NULL )
    {
        return ERROR;
    }
    if( bfDescriptor->memMgmtReqd == TRUE )
    {
        prevId = GetCurPoolId( );
        poolId = CreatePool( );
        SetCurPool( poolId );
        If( cntxt != NULL )
        {
            cntxt.SetDeepCopy( TRUE );
        }
    }
    status = bfDescriptor->batchFunction( this, cntxt );
    if( status != SUCCESS )
    {
        return ERROR;
    }
    if( bfDescriptor->memMgmtReqd == TRUE )
    {
        SetCurPool( prevId );
        FreePool( poolId );
    }
}
```

It is noted herein that all modeled classes inherit from class CppObj which provides the following behavior;

```
Class CppObj
{
private:
    ErrorStatus deepCopyFlag;
public:
    void SetDeepCopy( ErrorStatus value ) { deepCopyFlag = value; }
```

```
    ErrorStatus IsDeepCopyReqd( ) { return deepCopyFlag; }
    ErrorStatus DeepCopy( CppObj *src, CppObj *dest )
    {
        long size = src->sizeOfClass( );
        char *buf = new char [ size ];
        src->bundle( buf );
        dest->unbundle( buf );
        return SUCCESS;
    }
}
```

A template provided for setting attribute name (Set<attributeName>) method for every modeled class is as shown below,

```
<modelledClass> :: Set<attributeName>( <modelledClassMember> *src )
{
    if( IsDeepCopyReqd( ))
    {
        DeepCopy( src, this-><attributeName> );
    }
    else
    {
        <attributeName> = src;
    }
}
```

It will be apparent to one with skill in the art that the code samples presented above are intended as an explanatory tool to provide actual examples of implementation and framework feasibility and support for the model architecture for a batch program and its functions.

In a preferred embodiment of the invention, all application errors encountered are collected along with the application context and stored in an in-memory container object. The container is a class and provides methods for logging the errors to a persistent storage. The framework calls these error identification and logging methods at commit and exit points. Framework provides a default implementation of error logging, which can be overridden by user.

The framework of the invention supports multi-threading through data-dependent routing. Data to be processed is divided into multiple orthogonal sets. This operation is a priori or known early, which makes it possible to code the functionality into a data provider of a batch function. Multi-threading behavior is achieved by invoking n batch programs simultaneously through a batch scheduler.

The extensible modeling framework enables many behaviors to be customized. For example, initialization of a batch program through overridden <BatchProgramName>::Init( ). Commit behavior of a batch program can be customized through overridden <BatchProgramName>::Commit( ) and <BatchProgramName>::ResetCommitInfo( ). Similarly for a batch function commit behavior is customizable through overridden <BatchFunctionName>::Commit( ) and <BatchFunctionName>::ResetCommitInfo( ). Class BatchProgram provided a shared area in the form of a Darray commitArrray for coordinating comments between a batch program and any of its batch functions.

Error logging behavior can be customized through overridden <BatchProgramName>::LogErrors( ) method. The framework supplies the errors encountered in a global Darray. The external world can call batch functions through BatchPgm::CallBatchFunction( ).

It will be apparent to one with skill in the art that the method and apparatus of the invention provides tool support for generating and managing batch programs in a comprehensive manner and automates the process to a large extent. The framework provides a higher level of model abstraction than is known in the prior art of general modeling. Increased productivity is realized through the model-based generative approach described in this specification.

It will also be apparent to one with skill in the art the method and apparatus of the invention simplifies complex issues like memory management, recovery and restart, as well as scheduling and error logging. This is accomplished by providing a default behavior that can be overridden.

The framework-based solution enables customization by users and delivers a platform-agnostic solution that can be realized on a variety of implementation platforms.

The method and apparatus of the invention can be utilized in any systems environment where batch programming is utilized. Therefore the method and apparatus of the invention should be afforded the broadest scope. The method and apparatus of the invention is limited only by the claims that follow:

What is claimed is:

1. A method for automatically generating a new data processing batch program comprising:
    (a) identifying an invariable part of all data processing batch programs
    (b) inserting in the invariable part one or more place-marks where one or more variable parts will need to be inserted;
    (c) identifying at least one declarative specification of the new data processing batch program in the form of a model;
    (d) generating necessary variable portions of the new data processing batch program using the at least one model; and
    (e) inserting the variable portions into the invariable part at the place-marks.

2. The method of claim 1 wherein a meta model is defined to specify a data processing batch program in the form of a model.

3. The method of claim 1 wherein the modeling language is an extension of unified modeling language.

4. The method of claim 1 wherein in steps (d) and (e) are automated.

5. The method of claim 1 wherein the variable portions include functions of the new data processing batch program.

6. The method of claim 5 wherein the functions include at least a restart function.

7. The method of claim 6 wherein the modeling language is an extension of unified modeling language.

8. The system of claim 5 wherein the model conforms to the meta model defined to specify a data processing batch program.

9. The method of claim 1 wherein in steps (d) and (e) are automated.

10. A system for specifying a new data processing batch program, comprising:
    a memory having recorded thereon a software instance;
    an invariable part of all data processing batch programs presented as an extensible code library;
    at least one place-mark positioned at a point in the invariable part;
    at least one necessary variable part for insertion into the invariable part; and
    a model representing the software instance, executing from a memory, generates the necessary variable parts are generated using a model and inserts the generated variable parts into the invariable portion at the place-mark.

11. The method of claim 10 wherein the variable portions are specific functions of the new batch program.

12. The method of claim 11 wherein the functions include at least a restart function.

* * * * *